United States Patent [19]

Madate

[11] Patent Number: 5,097,496

[45] Date of Patent: Mar. 17, 1992

[54] SHEET EXTRACTING MECHANISM WITH FUNCTION FOR DETECTING THE AMOUNT OF STACKED SHEETS AND RECORDING SYSTEM UTILIZING THE SAME

[75] Inventor: Haruhisa Madate, Yokohama, Japan

[73] Assignee: Canon Kabushiki Kaisha, Tokyo, Japan

[21] Appl. No.: 672,634

[22] Filed: Mar. 20, 1991

[30] Foreign Application Priority Data

Mar. 26, 1990 [JP] Japan .................... 2-77655

[51] Int. Cl.5 .................... G03B 42/04; B65H 3/08
[52] U.S. Cl. .................... 378/173; 378/174; 378/171; 271/107
[58] Field of Search ............ 378/173, 171, 174, 182, 378/184; 271/152, 11, 103, 105, 107, 153, 108

[56] References Cited

U.S. PATENT DOCUMENTS

| | | | |
|---|---|---|---|
| 3,837,638 | 9/1974 | Anderson et al. | 271/98 |
| 4,624,454 | 1/1986 | Grützmacher et al. | 271/153 |
| 4,920,553 | 4/1990 | Sasaki et al. | 378/173 |
| 4,936,566 | 6/1990 | Hiramatsu | 271/108 |
| 5,037,080 | 8/1991 | Wirz | 271/107 |

Primary Examiner—Janice A. Howell
Assistant Examiner—Don Wong
Attorney, Agent, or Firm—Fitzpatrick, Cella, Harper & Scinto

[57] ABSTRACT

A sheet extracting mechanism is provided with a suction cup for attracting one of stacked sheets, a negative pressure source for supplying a suction force to the suction cup, a detector for detecting the pressure in the suction cup, a moving mechanism for moving the suction cup thereby extracting the sheet adhered to the suction cup by the section force, and a discriminator for comparing the suction force in the suction cup with a predetermined pressure, at a predetermined position located a predetermined distance from the bottom of the stack of sheets, thereby identifying the amount of the stacked sheets. The suction cup is temporarily stopped at the predetermined position corresponding to a predetermined number of remaining sheets, and the remaining number of sheets is identified equal to or less than the predetermined number when the suction cup no longer touches the sheet, thereby becoming unable to attract the sheet.

8 Claims, 5 Drawing Sheets

SHEET EXTRACTING MECHANISM WITH FUNCTION FOR DETECTING THE AMOUNT OF STACKED SHEETS AND RECORDING SYSTEM UTILIZING THE SAME

BACKGROUND OF THE INVENTION

1. Field of the Invention

The present invention relates to a mechanism for detecting the remaining amount of films for use in an apparatus for photographing or recording by extracting sheet films one by one with suction cups from a supply magazine.

2. Related Background Art

In sheet film photographing apparatus or recording apparatus for image recording on a film with a laser beam or the like, in which film sheet are loaded in a supply magazine and are extracted one by one for photographing by means of a film extracting mechanism such as suction cups, it is important to know exactly the amount of sheet films remaining in the supply magazine, and there have been proposed various detecting mechanisms for this purpose. As an example, the X-ray sheet film, used for so-called direct X-ray photographing for inspecting the interior of a human body by exposing said film to the X-ray transmitted by said human body, uses a substrate film of triacetate cellulose or polyester of a thickness of about 0.2 mm. Many photographing apparatus employ a method, instead of directly detecting the number of films in the supply magazine, of setting the number of films in a counter provided in the apparatus at the loading of films into the supply magazine and decreasing the count stepwise at each photographing operation. However, in such method, the remaining amount of films becomes unclear if the films are added to the supply magazine in the course of photographing operations or if the operator forgets to reset the counter, and there may result an inconvenience that the absence of film is known after the photographing operation is started. The operator is at least required to prepare new films or a new magazine when the remaining amount of films becomes low. For this reason there is preferred means for indicating the current remaining amount of films or for giving an alarm that the remaining amount has become equal to or less than a predetermined amount.

FIG. 5 illustrates a conventional system, disclosed in the Japanese Laid-open Patent Sho 63-82258, for directly detecting the films remaining in the supply magazine and informing a low remaining amount. Sheet films S are contained in a supply magazine 1. A suction cup 2 positioned thereabove is connected to a rotatable arm 3, and is further connected, through a flexible pipe 5, to a suction pump 4 generating a negative pressure. On said pipe 5 there is provided a pressure gauge 6 for measuring the negative pressure, and the signal of said suction gauge 6 is supplied to a discrimination circuit 7 for generating an alarm signal. At the rotating shaft of the arm 3 there is provided a potentiometer 8 for converting the rotating angle of the arm 3 into a resistance, and the signal from said potentiometer 8 is supplied to the discrimination circuit 7. The sucked film is fed to a photographing unit by a conveyor mechanism 9 with rollers.

The negative pressure generated by the suction pump 4 is supplied through the pipe 5 to the suction cup 2, which in this state is vertically moved by an unrepresented mechanism to film sheet S contained in the supply magazine 1, and the amount of vertical movement of the suction cup 2 is converted, through the arm 3, into the rotation of the potentiometer 8. When the suction cup 2 sucks the film sheet S, the interior of the pipe 5 changes from the atmospheric pressure to the negative pressure, and the amount of said change measured by the pressure gauge 6 is transmitted to the discrimination circuit 7. At said change from the atmospheric pressure to the negative pressure, the discrimination circuit 7 converts the amount of descent of the arm 3, namely the output of the potentiometer 8, into the remaining amount of films. Thus, if the correlation between the output of the potentiometer 8 and the remaining amount of films is determined in advance, the remaining number of film sheets S can be calculated when the pressure gauge 6 shows the negative pressure, namely when the film sheet S is sucked. When said remaining number reaches a predetermined level, an alarm is generated to request the operator to prepare new films, which will be loaded anew when the film sheet in the magazine are completely used.

In the conventional structure explained above, however, the amount of descent of the suction cup 2 may vary depending on the change in the negative pressure generated by the pump 4, the material and hardness of the suction cup 2 etc., eventually leading to an error in the measurement of the remaining amount of films, as shown in FIGS. 6 and 7. FIG. 6 illustrates a case of a hard suction cup, while FIG. 7 illustrates a case of a soft suction cup. Similarly, if the negative pressure of the suction pump 4 is strong, the film sheet S is sufficiently attracted to the suction cup 2, but, if said negative pressure is weak, the interior of the pipe 5 does not reach a predetermined negative pressure unless the suction cup 2 is sufficiently adhered to the sheet film S. In this manner the amount of descent of the suction cup 2 is dependent on the flexibility of the suction cup 2 and the negative pressure generated by the pump 4, and results in inaccurate measurement of the remaining amount of the films when said amount of descent is converted into the remaining amount of films.

SUMMARY OF THE INVENTION

An object of the present invention is to provide a mechanism for detecting the remaining amount of film sheets, free from the above-mentioned drawbacks and capable of accurately determining the remaining amount of film sheets with a simple structure.

Another object of the present invention is to provide a system employing said mechanism.

DESCRIPTION OF THE PREFERRED EMBODIMENTS

Figure 1:
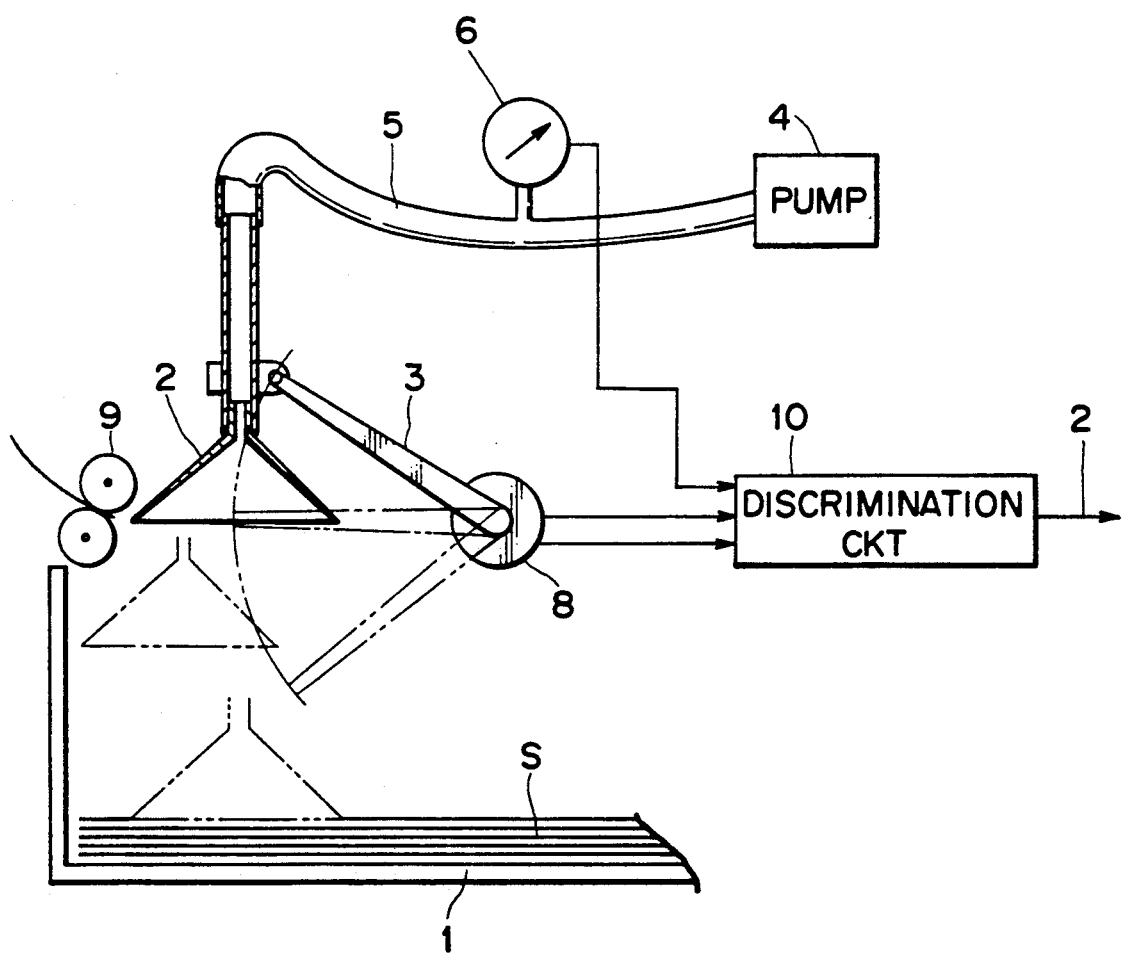
FIG. 1 is a schematic view of an embodiment of the film amount detecting mechanism of the present invention.
Figure 5:
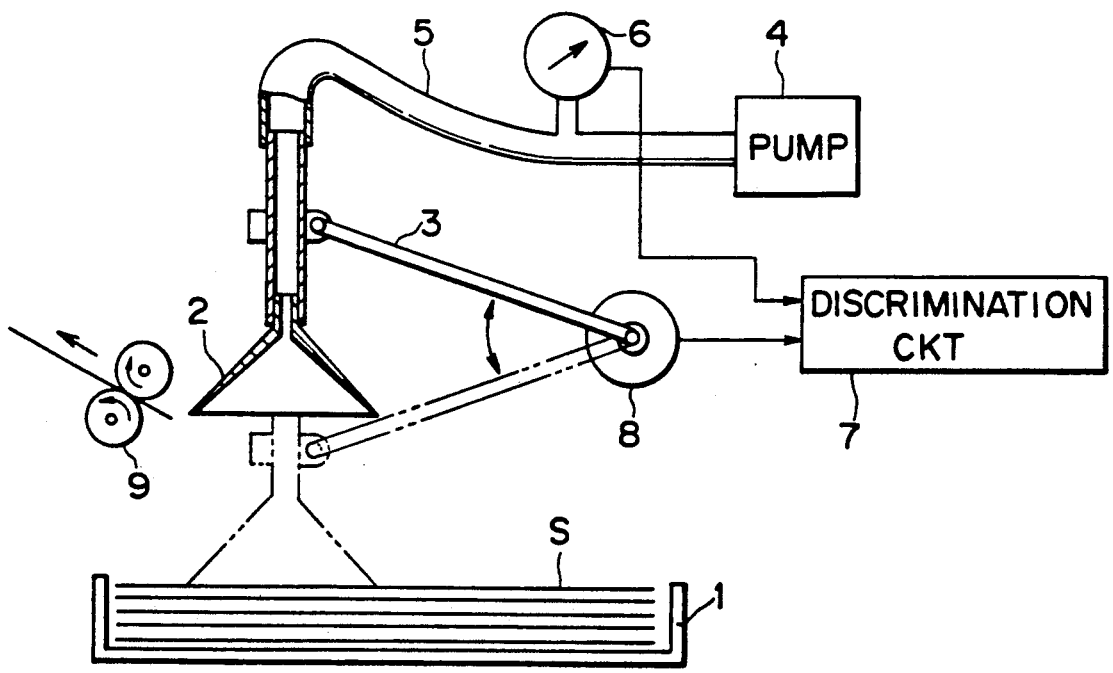
FIG. 5 is a schematic view of a conventional mechanism.
Figure 6:
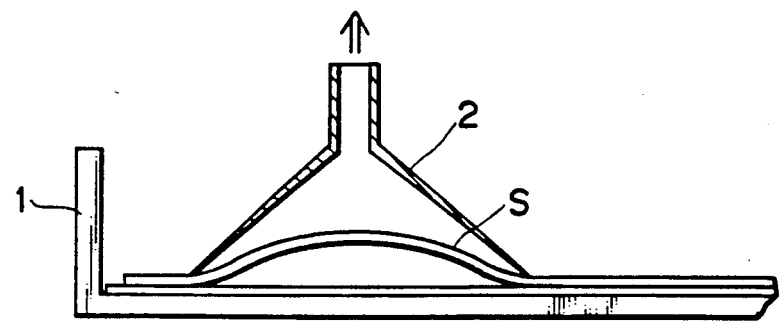
FIG. 6 is a view showing the function of a hard suction cup.
Figure 7:
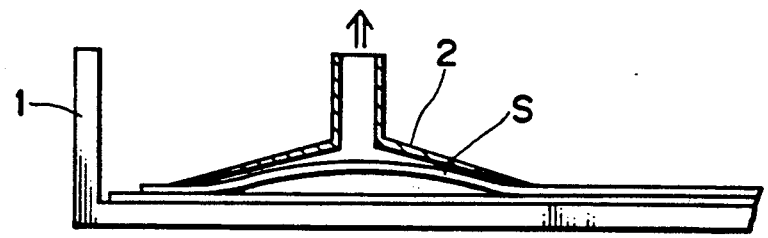
FIG. 7 is a view showing the function of a soft suction cup.

Now the present invention will be clarified in detail by an embodiment thereof shown in FIG. 1, wherein the same components as those in FIG. 5 are represented by the same numbers.

Referring to FIG. 1, the outputs of the potentiometer 8 and the pressure gauge 6 are supplied to a discrimination circuit 10. As in the conventional structure, the negative pressure generated by the suction pump 4 is guided by the pipe 5 to the suction cup 2, which is moved perpendicularly to the film S by an unrepresented vertical movement mechanism, and the amount of vertical movement of the suction cup 2 is converted by the arm 3 into the rotating angle of the potentiometer 8.

When the film sheet S is sucked by the suction cup 2, the pressure in the pipe 5 becomes equal to the negative pressure generated by the suction pump 4, so that the discrimination circuit 10 sends a signal for elevating the suction cup 2 to said vertical movement mechanism. A temporary stop position is defined as where the suction cup 2 no longer contacts the film S when the film sheet in the supply magazine 1 are decreased to a predetermined number. Said temporary stop position varies according to the kind of film, even for the same number of film sheets, since the thickness of film sheets varies according to the kind thereof. When the film sheets S reach a predetermined remaining number, the suction cup 2 no longer touches the film, so that the interior of the pipe 5 does not reach the negative pressure even after suction for a predetermined time by the suction pump 4. In this state the suction cup 2 is not deformed, so that the reproducibility of vertical position thereof is high. A signal corresponding to the output of the potentiometer 8 at said temporary stop position is given in advance to the discrimination circuit 10. When said output is released from the potentiometer 8, the vertical movement mechanism for the suction cup is temporarily deactivated, and the discrimination circuit 10 discriminates, by the pressure measured by the pressure gauge 6, whether the film S is sucked by the suction cup 2. When the suction cup 2 contacts the film S before reaching said temporary stop position, the suction cup 2 attracts the film S whereby a suction signal is released through the pressure gauge 6 and the discrimination circuit 10 to elevate the suction cup 2 to the conveyor mechanism by the vertical movement mechanism. On the other hand, if the suction cup 2 reaches the temporary stop position without sucking the film S, the discrimination circuit 10 releases an alarm signal. Based on said signal an alarm is given to the operator by display or acoustic means, thereby requesting the additional film sheets. Once low remaining amount of film sheets is detected and the alarm is generated, the detection of the remaining amount by temporary stopping at the subsequent film extraction is no longer necessary, and the alarm can be continued until all the film sheets are used and replaced by new ones by the operator.

In the foregoing embodiment, the amount of vertical movement of the suction cup 2 is converted through the rotation of the arm 3 into the output of the potentiometer 8, but it is also possible to employ a stepping motor with an encoder in the vertical movement mechanism for the suction cup 2 and to read the amount of vertical movement from the number of pulses of said encoder.

The stacked sheets need not be placed horizontally as shown in the foregoing embodiment, and the mechanism of the present invention is likewise effective for the sheets placed in inclined manner.

An explained in the foregoing, the film amount detecting mechanism of the present invention, being so designed as to detect a position where the suction cup no longer touches the films, is capable of accurately measuring the remaining amount of film sheets, and is capable of improving the performance without an increase in cost, and with few additional parts in comparison with the conventional mechanism utilizing a suction cup.

Figure 2:
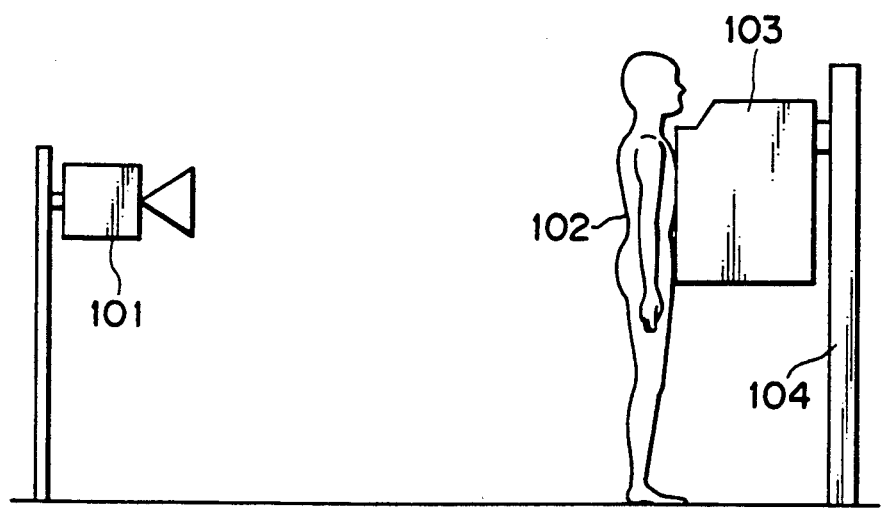
FIG. 2 is a schematic view of an X-ray photographing system.

In the following there will be explained an embodiment in which the above-explained extracting mechanism is applied to a system for X-ray photographing the chest of a person to be inspected. FIG. 2 schematically shows an X-ray photographing system for the chest of a person, in which there are shown an X-ray tube 101, a person 102 to be inspected, an X-ray photographing apparatus 103, and a rack 104 therefor.

Figure 3:
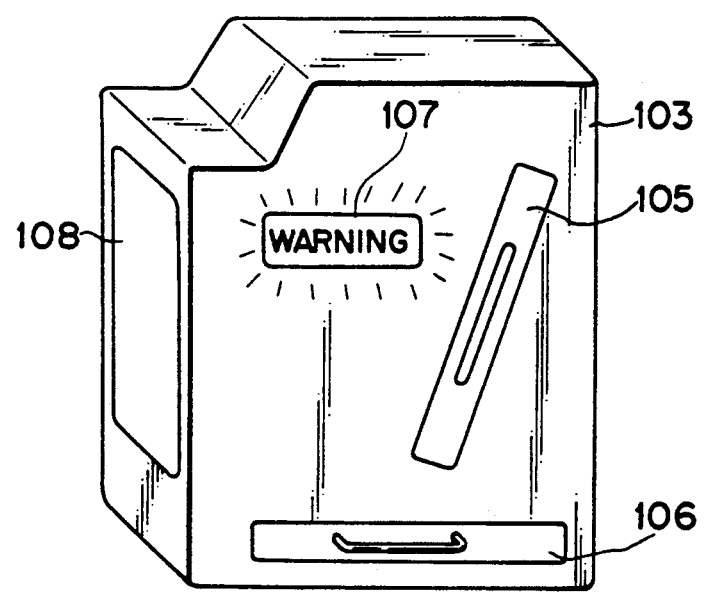
FIG. 3 is an external view of an X-ray photographing apparatus.

FIG. 3 is an external view of the X-ray photographing apparatus 103 shown in FIG. 2. A magazine 105 contains unused X-ray film. A magazine 106 contains already exposed films. These magazines are mounted on the X-ray photographing apparatus as illustrated. A lamp 107 gives a warning indicating a low remaining amount of film sheets. Inside the apparatus there is provided the sheet extracting mechanism explained above (not shown), and the lamp 107 flashes, thereby warning the operator, when the remaining amount of film sheets reaches a predetermined number. The chest of the person to be inspected contacts a chest plate 108, inside which there is provided a photographing stage for setting a film. A film taken out from the magazine 105 by said unrepresented extracting mechanism is conveyed to and supported in said photographing stage, and is exposed to X-ray thereby recording the X-ray image of the chest of said person. The exposed film is transported to the magazine 106 by an unrepresented conveyor mechanism.

Figure 4:
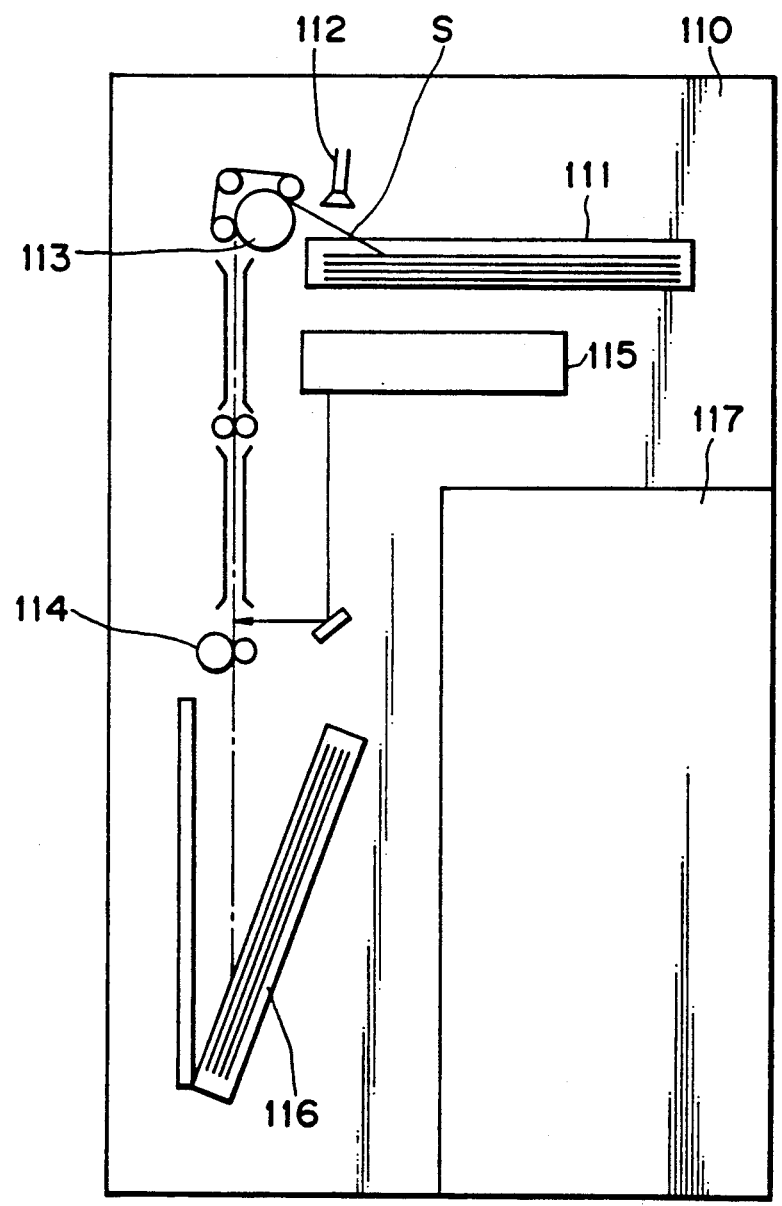
FIG. 4 is a schematic view of a laser beam printer.

In the following there will be shown, as another embodiment, a system of a laser printer for recording an image on a film with a laser beam. FIG. 4 shows the internal structure of said laser beam printer. In a main body 110, a supply magazine 111 contains plural unused film sheets in a stacked state. A suction cup 112 is driven by a similar mechanism as explained above, thus extracting the film and detecting the remaining amount of film sheets. A warning is given to the operator when said remaining amount of film sheets reaches a predetermined number. The film S extracted by suction by the suction cup 112 is fetched at the leading end by a conveyor mechanism utilizing transport rollers 113, and is transported along a transport path. In said path there are provided sub scanning rollers 114, and main scanning operation is conducted in the vicinity of said rollers by a laser beam coming from an optical unit 115. The optical unit contains a laser light source, a polygon mirror for deflecting the laser beam, a modulator for modulating said laser beam according to recording signals etc. Image recording is achieved by the main scanning with the modulated laser beam from the optical unit 115 on the film transported in the sub scanning direction. After the recording, the film drops by the weight thereof and is stored in the magazine 116. A controller unit 117 incorporates a control circuit for controlling the entire apparatus, a power supply etc.

I claim:

1. A sheet extracting mechanism for detecting the amount of sheets in a stack, comprising:
   a suction cup for applying a suction force to one of the sheets in the stack;
   means for providing said suction cup with a negative pressure to provide the suction force;
   means for detecting the suction force in said suction cup;
   a moving mechanism for moving said suction cup with a sheet adhered thereto by the suction force to extract the sheet; and
   discrimination means for comparing the suction force in said suction cup with a predetermined pressure when said suction cup is disposed in a predetermined position located a predetermined distance from the bottom of the stack of sheets, thereby identifying the amount of stacked sheets.

2. A mechanism according to claim 1, further comprising:
   means for temporarily stopping said suction cup at said predetermined position, in identifying the amount of stacked sheets.

3. A mechanism according to claim 1, further comprising:
   alarm means for generating an alarm based on the output of said discrimination means.

4. A mechanism according to claim 1, further comprising:
   conveyor means for conveying the extracted sheet to a recording position; and
   recording means for recording an image on the sheet at the recording position.

5. A mechanism according to claim 4, wherein the sheet is photographic film, and said recording means effects photographic recording on the film.

6. A mechanism according to claim 5, wherein the photographic recording records an object image by X-ray on the film.

7. A mechanism according to claim 4, wherein the sheet is a photographic film, and said recording means comprises means for image recording on the film with a modulated light beam.

8. A mechanism according to claim 7, wherein said recording means includes a laser light source.

* * * * *

UNITED STATES PATENT AND TRADEMARK OFFICE
CERTIFICATE OF CORRECTION

PATENT NO. : 5,097,496
DATED : March 17, 1992
INVENTOR(S) : Haruhisa Madate

It is certified that error appears in the above-identified patent and that said Letters Patent is hereby corrected as shown below:

COLUMN 1:

Line 17, "sheet" should read --sheets--.
   Line 21, "know" should be deleted.

COLUMN 2:

Line 20, "sheet" should read --sheets--.

COLUMN 3:

Line 24, "sheet" should read --sheets--.

Signed and Sealed this

Twentieth Day of July, 1993

Attest:

MICHAEL K. KIRK

Attesting Officer  Acting Commissioner of Patents and Trademarks